United States Patent
Heil et al.

(10) Patent No.: US 9,501,491 B1
(45) Date of Patent: Nov. 22, 2016

(54) FILE FORMAT ARTICLE OF MANUFACTURE

(71) Applicant: THE UNITED STATES OF AMERICA AS REPRESENTED BY THE SECRETARY OF THE NAVY, Washington, DC (US)

(72) Inventors: Rodney Heil, Hope, ID (US); Jeffrey Zyla, Jackson, MI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 260 days.

(21) Appl. No.: 14/320,716

(22) Filed: Jul. 1, 2014

Related U.S. Application Data

(63) Continuation-in-part of application No. 13/043,762, filed on Mar. 9, 2011, now abandoned.

(51) Int. Cl.
*G06F 17/30* (2006.01)

(52) U.S. Cl.
CPC ... *G06F 17/30179* (2013.01); *G06F 17/30153* (2013.01)

(58) Field of Classification Search
CPC ....................................................... G06F 17/30
USPC ......................................................... 709/247
See application file for complete search history.

(56) References Cited

U.S. PATENT DOCUMENTS

2006/0288019 A1* 12/2006 Bauer ..................... G06F 8/52
2009/0044095 A1* 2/2009 Berger .............. G06F 17/30569
715/226

OTHER PUBLICATIONS

Gonnerman, "dif.py—Navy DIF File Handler", http://newcenturycomputers.net/projects/dif.html.*
Chris Gonnerman, "dif.py—Navy DIF File Handler," http://newcenturycomputers.net/projects/dif.html, 2001.

* cited by examiner

*Primary Examiner* — Suraj Joshi
(74) *Attorney, Agent, or Firm* — James M. Saunders

(57) ABSTRACT

Embodiments of the invention are directed to a list of floating counts (LFC) apparatus for providing storage of tables of numerical data using a column-wise data table descriptive language with a non-transitory electronic-processor-readable medium executing an LFC storage computer program. The embodiments include an LFC computer program that is operatively associated with an electronic processor. An LFC computer file and at least one LFC file header that is operatively associated with the electronic processor and the LFC computer program. The LFC computer program is configured to store information in the LFC computer file. Tabular data is operatively-associated with the LFC computer file. At least one LFC file header at least partially describes the tabular data and is non-compressed and human readable.

20 Claims, No Drawings

FILE FORMAT ARTICLE OF MANUFACTURE

CROSS-REFERENCE TO RELATED APPLICATIONS

This is a continuation-in-part application, claiming the benefit of parent non-provisional application Ser. No. 13/043,762 filed on Mar. 9, 2011, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a computer readable medium having a file encoded thereon in a particular format.

DESCRIPTION OF EMBODIMENTS OF THE INVENTION

Embodiments of the invention generally relate to a computer readable medium encoded with a computer file according to a file format. Certain technology groups have immense databases of files. In particular, radiation pattern files can be very large. Reducing the file size of radiation pattern file size improves the overall performance of the database, requires less disk space, and speeds file transfers. Keeping a header of each file in a readable form allows a user to check the file summary information using standard text editors.

Embodiments employ an .LFC format that is configured for compressing radiation pattern data. In embodiments, "lfc" is an acronym for a "list of floating counts." In the past, radiation pattern data files have typically taken the form of simple ASCII text files, which are convenient to use and human-readable using any text editor. However, the text files tend to be bulky. Several facilities are producing thousands of these types of files and the need has arisen to make the files smaller. The use of a general-purpose file compression utility would compress the entire file, including a file header, which would therefore no longer be human-readable. However, the need exists to keep the header in a human-readable form, so that a user can tell what kind of data is contained in the file, even if the data itself was compressed. The .LFC file format was created to make the overall file size of radiation pattern data files smaller by compressing the data in the file, while keeping the header information for these data files in a human-readable format.

Thus, embodiments of the invention use a human-readable header combined with a compressed data block configured for radiation pattern data files. The radiation pattern data is presented as a table of numerical data in some embodiments. In other embodiments, the data may also be presented as non-numerical data. A person having ordinary skill in the art, however, will recognize that embodiments of the invention are not solely limited to radiation pattern data file applications. The embodiments can be used in any application where files tend to be bulky if not compressed and the need exists to have a human-readable header.

Embodiments may be implemented as an apparatus or article of manufacture using programming and/or engineering techniques to produce software, firmware, hardware, or any combination thereof. The term "article of manufacture" as used herein is intended to encompass one or more computer programs and data files accessible from and/or stored on one or more non-transitory computer-readable medium (devices, carriers, or media), including, for example, a magnetic storage media, "floppy disk," CD-ROM, RAM, a PROM, an EPROM, a FLASH-EPROM, any other memory chip or cartridge, a file server providing access to the programs via a network transmission line, holographic unit, and similar methods in the art. Those skilled in the art will recognize that many modifications may be made to this configuration without departing from the scope of embodiments of the invention.

The term 'computer' is sometimes used herein as an 'electronic processor.' As used herein, the term 'computer file' means 'a data and/or program file encoded for manipulation by computer." As used herein, the term 'file format' means 'the particular way the information for storage in a computer file is encoded.'

Embodiments of the invention include a non-transitory computer readable medium encoded with a computer file (in this case a 'LFC File') according to a file format. The file format provides a way of storing large tables of numerical data using a column-wise data table descriptive language. The LFC File format encodes information in a computer file such that: 1) at least one header ("LFC File Header" and/or "Table Header") describing the information for storage (or 'tabular data') is non-compressed; and 2) the information for storage (or 'tabular data') is stored in either a binary (compressed form) or non-compressed form.

As used herein, the term "LFC File Header" is an uncompressed part of the LFC File; the LFC File Header includes everything from the beginning of the LFC File to the carriage return following the Begin Data command (described below).

As used herein, the term "Table Header" refers to a contiguous block of meta-data that describes any one given table within the LFC File. Each table in the LFC File has one Table Header. In other words, a Table Header is that part of an LFC File Header which (in multi-table LFC Files) starts with a Table name command (described infra) and ends with either the next Table name command or the Begin Data command, and which (in single-table LFC Files) consists of all the commands except Begin Data.

Embodiments of the invention may also be referred to as a list of floating counts (LFC) apparatus for providing storage of tables of numerical data using a column-wise data table descriptive language with a non-transitory electronic-processor-readable medium executing an LFC storage computer program. The apparatus includes an electronic processor and a list of floating counts (LFC) computer program that is operatively associated with the electronic processor. A list of floating counts (LFC) computer file and a least one list of floating counts (LFC) file header that is operatively associated with the electronic processor and the LFC computer program. The LFC computer program is configured to store information in the LFC computer file. Tabular data is operatively associated with the LFC computer file. At least one list of floating counts (LFC) file header at least partially describes the tabular data. The LFC file header is non-compressed and is in a human readable form. It is understood, therefore, that embodiments of the invention also include a visual display screen allowing a user to view and read the LFC file header.

Each of TABLES I, II, and III below illustrate prophetic LFC File Header Examples 1, 2, and 3, respectively. TABLES I and II also illustrate a prophetic Table Header within an LFC File Header. Note that an LFC File Header in accordance with the principles of the invention may have more or less Table Headers than included in the example. Also, Table Headers in accordance with the principles of the invention can include different commands (and using different command language to call a command), and include different parameter(s), and sub-header(s) than those included in the examples.

TABLE I

Prophetic File Header Example 1

TABLE_NAME = "First Test"
TABLE_ATTRIBS = "txt"
This data was collected using the setup denoted in FIG. 9 of Chapter 13 of
the Gadgetry Test Manual on Jul. 5, 2009. Units are millivolts.
BEGIN_TABLE = "2"
MAKE_COLUMN = "Input Voltage"
MAKE_COLUMN = "Output Voltage"

TABLE II

Prophetic File Header Example 2

TABLE_NAME = "Second Test"
TABLE_ATTRIBS = "txt"
This data was collected using the setup denoted in FIG. 9 of Chapter 13 of
the Gadgetry Test Manual on Jul. 6, 2009. Units are millivolts.
BEGIN_TABLE = "3"
MAKE_COLUMN = "Input Voltage"
MAKE_COLUMN = "Output Voltage"

TABLE III

Prophetic file Header Example 3

BEGIN_DATA = "binary32"

TABLES I & II are each an example of a Table Header, with each (TABLES I & II) describing a different table. Embodiments are part of a Data Table Descriptive Language. Just as Verilog is a hardware descriptive language, or HTML is a web page descriptive language, the commands described are part of a Data Table Descriptive Language because they describe how to build a table of data. For example, in TABLES I & II, the "MAKE-COLUMN" command causes a column to be added to the table with a specified name (see "Input Voltage" and "Output Voltage").

TABLE III does not describe any table at all, but rather simply signals the end of the LFC File Header and the beginning of the data block. In multi-table LFC Files, the table name command is the first command in a Table Header.

A computer file using an embodiment(s) of the file format (an LFC File) may contain multiple data tables. Embodiments of the invention are extremely versatile for representing data. The file format allows as many rows and columns as are needed, based on particular project-specific needs. Likewise, further research areas can include expanding the capability to 3- and 4-dimensional data tables.

Embodiments of the LFC File format include commands that encode information in a computer file; each command is identified syntactically using associated pre-determined language. A parsing program identifies a command (and causes a computer to execute the command) when pre-determined language (a 'command word') representing the command is recognized by the parsing program. A 'command phrase' includes the command word in pre-determined language representing, and all parameters associated with, the command. Note that the command word designating a particular command in this specification, including the claims, is used for the purpose of easily referring to a command; a person having ordinary skill in the art will recognize that embodiments of an LFC File (and format) can use different pre-determined language (command word(s)) to represent an LFC File command(s).

Embodiments of the LFC File format further include an LFC File Header that includes a computer executable command referred to herein as a 'begin data' command. The begin data command includes a 'begin data command phrase' having a 'begin data command word' and 'begin data parameter.' When executed by a computer, the begin data command causes the computer to operatively associate the command with the end of all ASCII header and table descriptive language and the beginning of a binary data block. The Begin Data parameter indicates the type of binary encoding of said binary data block. For example, standard IEEE-754 32-bit floating point in little-endian order is encoded and denoted by "binary32le."

If the data block is subsequently compressed with zlib, it is encoded and denoted by "binary32le-zlb." The "zlb" designation, designating "zipped less than binary," is used if the data needs to be compressed even smaller than simple binary representation. A file so compressed could also be given an .LFZ ("list of floating zipped") files extension to indicate that the data has been even further compressed, although an .LFC extension is also valid.

Embodiments of the LFC File format include a Table Header within the LFC File Header that includes a computer executable 'begin table' command; the begin table command includes a 'begin table command phrase' (having a 'begin table command word' and a 'begin table command parameter'). When executed by a computer, the begin table command causes the computer to operatively identify the begin table command word as the beginning of a column description for the table the Table Header describes. The begin table command parameter establishes the number of rows of the table with which the begin table command is associated.

Embodiments of the LFC File format include a Table header within the LFC File Header that includes a computer executable 'table attribs' command; the table attribs' command includes a 'table attribs command phrase' having a 'table attribs command word,' a 'table attribs command first parameter,' and a 'table attribs command second parameter.' When executed by a computer, the table attribs command causes the computer to operatively associate meta data with a table of data. The table attribs command first parameter: 1) serves as the name for a set of attributes that form a second parameter; and 2) and provides a description of the format of the meta data that form the set of attributes in the table attribs command second parameter.

Embodiments of the LFC File format further include a Table Header within the LFC File Header that includes a computer executable command that, when executed by a computer, causes the computer to a create a column of tabular data by performing the following using an associated table of data: 1) allocate space (or memory) in which to place the column of data; 2) name the column of data; 3) organize the tabular data as a column within a table; and 4) when this command appears within a FOR loop, fill the allocated space with automatically-generated numbers. This command is referred to herein as the 'create column(s)' command. The create column(s) command includes a 'create column(s) command phrase' having a 'create column(s) command word' and a 'create column command parameter'; the create column(s) parameter establishes the name of the column(s) of tabular data for the table with which the create column(s) command is associated. The number of columns in a table corresponds to the number of create column commands associated with the table.

Embodiments of the LFC File format include a Table Header within the LFC File Header that includes a computer executable command that, when executed by a computer, creates a column algorithmically. When the data values in a column follow a simple linear pattern, this command (referred to herein as a "FOR" command) provides a way of creating those columns without explicitly listing each value. It is used in conjunction with the 'create column' command and it is terminated with the ROF command. The FOR command includes a 'FOR command phrase' having a 'FOR command word', a 'FOR command first parameter', a 'FOR command second parameter', a 'FOR command third parameter', and a 'FOR command fourth parameter'. The FOR command first parameter serves as the name of the column to be iterated. The FOR command second parameter represents the start value for the iteration. The FOR command third parameter represents the stop value for the iteration. The FOR command fourth parameter represents the increment value for the iteration. The order of the create column commands determines which column comes first. Three For command examples are provided in TABLES IV, V, & VI. The order of the FOR commands determines which values increment first—the inner loop increments first; thus, For example 2 produces a different table than For example 3. Note that when a 'create column' command occurs inside a FOR loop, its name must match the name given in a FOR command.

TABLE IV

FOR Example 1

FOR name="Phi" start=0 stop=300 step=60
MAKE_COLUMN = "Phi"
ROF
produces the following column of data and names it Phi:
0
60
120
180
240
300

TABLE V

FOR Example 2

FOR name="Theta" start=0 stop=90 step=45
FOR name="Phi" start=0 stop=270 step=90
MAKE_COLUMN ="Theta"
MAKE_COLUMN ="Phi"
ROF
ROF
produces the following two columns of data, Theta and Phi respectively:
0   0
0   90
0   180
0   270
45   0
45   90
45   180

TABLE V-continued

FOR Example 2

45   270
90   0
90   90
90   180
90   270

TABLE VI

FOR Example 3

FOR name="Phi" start=0 stop=270 step=90
FOR name="Theta" start=0 stop=90 step=45
MAKE_COLUMN = "Theta"
MAKE_COLUMN = "Phi"
ROF
ROF
would produce:
0    0
45   0
90   0
0    90
45   90
90   90
0    180
45   180
90   180
0    270
45   270
90   270

Some embodiments of the LFC File format further include a LFC File Header that includes a Table Header including a command that, when executed by a computer, causes the computer to copy a column of tabular data. This command is referred to herein as 'copy column' command. The 'copy column command' includes a 'copy column command phrase' having a 'copy column command word' and a 'copy column command parameter'. The copy column command parameter provides the name of a previously used column which is to be copied into the current table. For example, when an LFC File includes two tables that both have Theta and Phi columns, one would create them algorithmically in the first table, and then use the copy column command to copy them over to the second table. The two tables must have the same number of rows.

Some embodiments of the LFC File format include a LFC File Header that includes a Table Header including a command that, when executed by a computer, causes the computer to use a modified set of attributes and values of a pre-determined table within the computer file; the modified set of attributes and values of the pre-determined table within the file being identical to the attributes and values of the pre-determined table except for the attributes and values identified in the 'change attributes second parameter.' This command is referred to herein as a 'change attributes' command. The change attributes command includes a 'change attributes command phrase' having a 'change attributes command word', a 'change attributes first parameter', and a 'change attributes second parameter'. The change attributes first parameter provides the name of a previously defined sub-header or attribute set (as well as an indicator of the formation of the second parameter), which is to be copied to the current table with whatever changes are indicated in the second parameter. The second parameter is a list of attributes that are to be different than the attributes of the pre-determined table. When the LFC File contains multiple tables, and the headers for the tables are very similar but for a few exceptions, this command provides a means for stipulating what is different for the table to follow. That is, instead of having a long header for each table, you can have a long header for the first table, and instead of using the table attribs command for subsequent headers, the change attributes command can be used for specifying what is different such as, for example, frequency.

In some embodiments, the LFC File format includes a LFC File Header that includes a Table Header including a command that, when executed by a computer, causes the computer to operatively associate a table with a pre-determined table name. This command is referred to herein as the 'table name' command. The table name command has a table name command includes a 'table name command phrase' having a 'table name command word' and an 'table name command parameter' the table name command parameter establishes the pre-determined table name of the table with which the table name is associated. The table name command is required if the computer file contains multiple tables—otherwise, it is optional. Each table should have a unique name.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A radiation pattern data file size reduction apparatus having a human readable file header, said apparatus having a non-transitory computer readable medium encoded with a plurality of computer executable commands for the reduction of radiation pattern data file size in a compressed data block, comprising:
   an electronic processor;
   a list of floating counts (LFC) computer program operatively associated with said electronic processor;
   a list of floating counts (LFC) computer file and at least one list of floating counts (LFC) File Header operatively associated with said electronic processor and said LFC computer program, wherein said LFC computer program is configured to store information in said LFC computer file;
   tabular data operatively associated with said LFC computer file, wherein said tabular data is tabular radiation pattern data;
   at least one list of floating counts (LFC) File Header at least partially describing said tabular data, said LFC File Header being non-compressed and human readable; and
   a visual display screen operatively associated with said electronic processor, said visual display screen configured to display said LFC File Header.

2. The non-transitory computer readable medium of claim 1, wherein said at least one LFC File Header comprises a Begin Data command represented by pre-determined Begin Data language, wherein said LFC File extending from the beginning of said at least one LFC computer file to the carriage return following said Begin Data command, said Begin Data command being a computer executable command including a Begin Data command phrase having a Begin Data command word and Begin Data command parameter, when executed by a computer, said Begin Data command causes said computer to operatively associate said Begin Data command word with the end of all ASCII header and table descriptive language and the beginning of a binary data block, said Begin Data command parameter indicating the type of binary encoding of said binary data block.

3. The non-transitory computer readable medium of claim 2, wherein said at least one LFC File Header further comprises at least one Table Header, said at least one Table Header being a contiguous block of meta-data that describes a table, said Table Header including a plurality of computer executable commands.

4. The non-transitory computer readable medium of claim 3, wherein said plurality of computer executable commands comprises a table attribs command, said table attribs command including a table attribs command phrase having a table attribs command word, a table attribs command first parameter, and a table attribs second parameter, when executed by a computer, said table attributes command causing said computer to operatively associate imported meta data with a table of data, said table attributes command first parameter serving as the name of said table attribs command second parameter, said table attribs second parameter including a sub-header which comprises a set of attributes of said table of data.

5. The non-transitory computer readable medium of claim 4, wherein said table attributes command first parameter associated with said table attributes command further describes the format of said set of attributes.

6. The non-transitory computer readable medium of claim 5, wherein said plurality of computer executable commands further comprises a begin table command, said begin table command including a begin table command phrase having a begin table command word and a begin table command parameter, when executed by said computer, said begin table command causing said computer to operatively identify (assign/label) said begin table command word as the beginning of a column description for the table said at least one Table Header describes, said begin table command parameter establishing the number of rows of the table said at least one Table Header describes.

7. The non-transitory computer readable medium of claim 6, wherein said plurality of computer executable commands further comprises a create column(s) command including a create column(s) command phrase having a create column(s) command word and a create column(s) command parameter; when executed by said computer, said create column(s) command causing said computer to create a column of tabular data; said create column(s) command parameter establishing the name of the column(s) of the table of tabular data which said at least one Table Header describes.

8. The non-transitory computer readable medium of claim 7, wherein said plurality of computer executable commands further comprising a FOR command having a FOR command phrase having a FOR command word, a FOR command first parameter, a FOR command second parameter, a FOR command third parameter, and a FOR command fourth parameter; when executed by said computer, said FOR command causing said computer to algorithmically generate a column of tabular data, said FOR command first parameter serving as the name of a column of tabular data to be iterated, said FOR command second parameter representing the start value for the iteration, said FOR command third parameter representing the stop value for the iteration; and said FOR parameter fourth parameter representing the increment value for the iteration.

9. The non-transitory computer readable medium of claim 8, wherein said plurality of computer executable commands further comprises a copy column command, said copy column command including a copy column command phrase, said copy column command phrase having a copy column command word and a copy column command parameter, when executed by said computer, said copy column command causing said computer to copy a column of tabular data, said copy column command parameter providing the name of a previously used column which is to be copied into table(s) associated with said at least one Table Header.

10. The non-transitory computer readable medium of claim 8, wherein said plurality of computer executable commands further comprises a change attributes command, said change attributes command including a change attributes command phrase, said change attributes command phrase having a change attributes command word, a change attributes command first parameter, and a change attributes command second parameter, when executed by said computer, said change attributes command causing said computer to assign a table a modified set of attributes and values defined in a pre-determined table attributes sub-header, said modified set of attributes and values being identical to the attributes and values defined in said pre-determined table attributes sub-header except for the attributes and values identified using said change attributes command second parameter, said change attributes command first parameter providing the name of said pre-determined table attributes sub-header as well as an indicator of the format of said change attributes command second parameter, said change attributes command second parameter indicating the changes to said attributes and values of said pre-determined table attributes sub-header.

11. The non-transitory computer readable medium of claim 9, wherein said plurality of computer executable commands further comprises a change attributes command, said change attributes command including a change attributes command phrase, said change attributes command phrase having a change attributes command word, a change attributes command first parameter, and a change attributes command second parameter; when executed by said computer, said change attributes command causing said computer to assign a table a modified set of attributes and values defined in a pre-determined table attributes sub-header, said modified set of attributes and values being identical to the attributes and values defined in said pre-determined table attributes sub-header except for the attributes and values identified using said change attributes command second parameter, said change attributes command first parameter providing the name of said pre-determined table attributes sub-header as well as an indicator of the format of said change attributes command second parameter, said change attributes command second parameter indicating the changes to said attributes and values of said pre-determined table attributes sub-header.

12. The non-transitory computer readable medium of claim 8, wherein said plurality of computer executable commands further comprises a table name command, said table name command including a table name command phrase, said table name command phrase having a table name command word and a table name command parameter, when executed by a computer said table name command causing said computer to operatively associate a table with a pre-determined table name, said table name command parameter establishing said pre-determined table name of the table with which said pre-determined table name is associated.

13. The non-transitory computer readable medium of claim 9, wherein said plurality of computer executable commands further comprises a table name command, said table name command including a table name command phrase, said table name command phrase having a table name command word and a table name command parameter, when executed by a computer said table name command causing said computer to operatively associate a table with a pre-determined table name, said table name command parameter establishing said pre-determined table name of the table with which said pre-determined table name is associated.

14. The non-transitory computer readable medium of claim 10, wherein said plurality of computer executable commands further comprises a table name command, said table name command including a table name command phrase; said table name command phrase having a table name command word and a table name command parameter, when executed by a computer said table name command causing said computer to operatively associate a table with a pre-determined table name, said table name command parameter establishing said pre-determined table name of the table with which said pre-determined table name is associated.

15. The non-transitory computer readable medium of claim 11, wherein said plurality of computer executable commands further comprises a table name command, said table name command including a table name command phrase, said table name command phrase having a table name command word and a table name command parameter; when executed by a computer said table name command causing said computer to operatively associate a table with a pre-determined table name, said table name command parameter establishing said pre-determined table name of the table with which said pre-determined table name is associated.

16. The non-transitory computer readable medium of claim 1, wherein said tabular data is in a compressed form.

17. The non-transitory computer readable medium of claim 8, wherein said tabular data is in a compressed form.

18. The non-transitory computer readable medium of claim 9, wherein said tabular data is in a compressed form.

19. The non-transitory computer readable medium of claim 10, wherein said tabular data is in a compressed form.

20. The non-transitory computer readable medium of claim 11, wherein said tabular data is in a compressed form.

* * * * *